Feb. 7, 1956                H. HEINS                2,734,174
                    RESONANT CAVITY ATTENUATOR
Filed May 14, 1953                              4 Sheets-Sheet 1

INVENTOR.
HAROLD HEINS
BY *Edgar O. Rost*

ATTORNEY

Feb. 7, 1956

H. HEINS 2,734,174

RESONANT CAVITY ATTENUATOR

Filed May 14, 1953

INVENTOR.
HAROLD HEINS
BY
ATTORNEY

INVENTOR.
HAROLD HEINS

INVENTOR.
HAROLD HEINS

United States Patent Office 2,734,174
Patented Feb. 7, 1956

2,734,174

RESONANT CAVITY ATTENUATOR

Harold Heins, Marblehead, Mass., assignor to Bomac Laboratories Inc., Beverly, Mass., a corporation of Massachusetts Application May 14, 1953, Serial No. 355,128

4 Claims. (Cl. 333—81)

The present invention relates generally to radio direction and ranging systems and more particularly to an attenuator for use in such systems.

Radio direction and ranging (radar) systems have found wide application in the control of guided missiles. This control involves the use of an antenna and radio receiving apparatus in the missile and transmitting equipment located remotely therefrom. High frequency radio signals transmitted at a high power level are detected by the sensitive receiving apparatus, consisting of a crystal detector and amplifier.

Difficulties are encountered with the difference in power levels at the point of launching and at a distance from the transmitter. Sensitive receiver crystals may be burned out by too intense a radio signal. Further, since the receiving apparatus is generally coupled with various electro-mechanical devices for detonating an armed missile, a serious problem exists in the storage and testing of missiles prior to launching.

Hollow pipe type wave guide adapted to transmit electro-magnetic waves of ultra and very high frequencies is characteristically employed in the receiving apparatus and considerable attenuation may be introduced into said wave guide structure to prevent deterioration of the crystal or premature detonation.

Various mechanical devices have been designed to attenuate the radio signal, such as a sheet of electrically conductive material extending through a slot in a section of wave guide with spring actuated means for removing the attenuator from a full attenuating position to a non-attenuating position after launching of the missile. Such devices are often bulky and add additional weight to the missile. Further, a disadvantage in such devices exists in that all receiving signals entering the antenna will be transmitted to the receiver when the attenuation has been removed.

It is, therefore, an object of the present invention to provide a novel attenuator which may be directly coupled in an electromagnetic wave system without any exterior mechanical devices for removing the attenuation mounted on the wave guide structure.

Another object is to provide an attenuating device which will permit only radio signals within a desired frequency range to be transmitted to the receiving apparatus when in non-attenuating position.

It is a still further object to provide a novel attenuating device for use in control of guided missiles which will protect the sensitive receiving apparatus at time of launching and remove said attenuation automatically at a predetermined time after launching.

Other objects and advantages will become apparent after consideration of the following detailed specification and accompanying drawings, in which.

The present invention attains the objects and advantages, stated above, by providing a resonant cavity with spaced conical members tuned to permit passage of radio signals of a desired frequency. An attenuating member is positioned within a hollow passage in one of the conical members and extends into the resonant cavity to contact the other conical member. Thus, a short circuit results with high insertion loss and the radio signal will be sufficiently attenuated to provide for protection of the sensitive radio receiver. An electromagnet is mounted in the device and when energized, the attenuation is removed by retraction of the attenuating member. Signals of the desired frequency will then be permitted to pass through the resonant cavity to the receiver with a minimum of attenuation. Inasmuch as the attenuation may be retracted by a relatively low voltage electromagnet and the energizing means may consist of ordinary cell type batteries, an excellent attenuating device for guided missile applications is possible. Further, because of the structure of the device, it will withstand considerable shock and vibration. In an embodiment no adverse effects were measured, up to a 50 g. acceleration.

Figure 1:
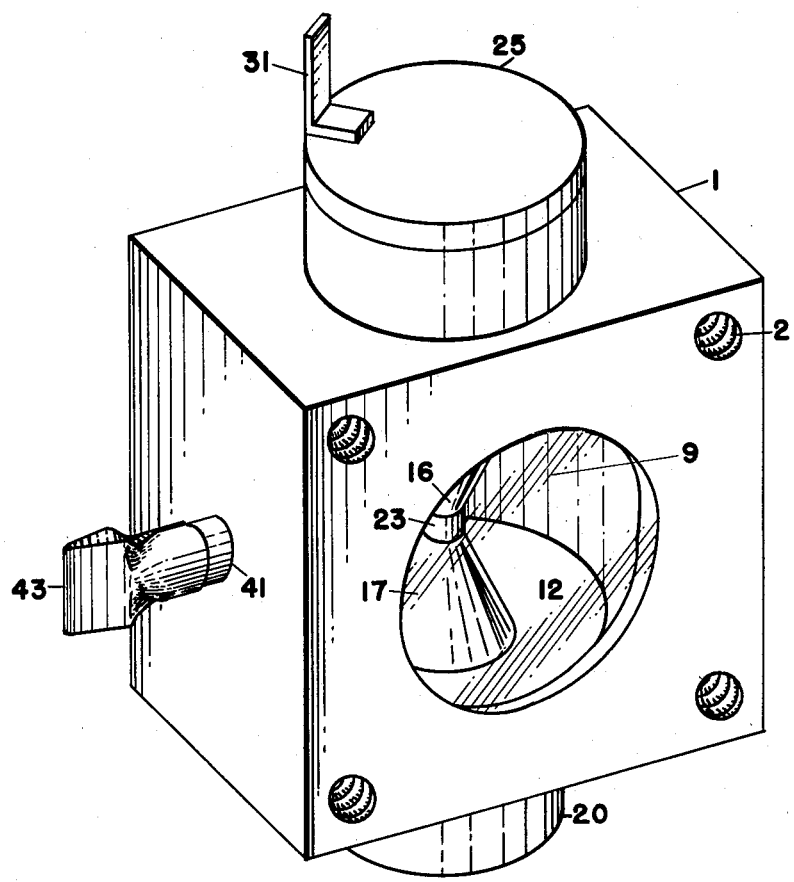
Figure 1 is a perspective view of an illustrative embodiment of the invention.
Figure 2:
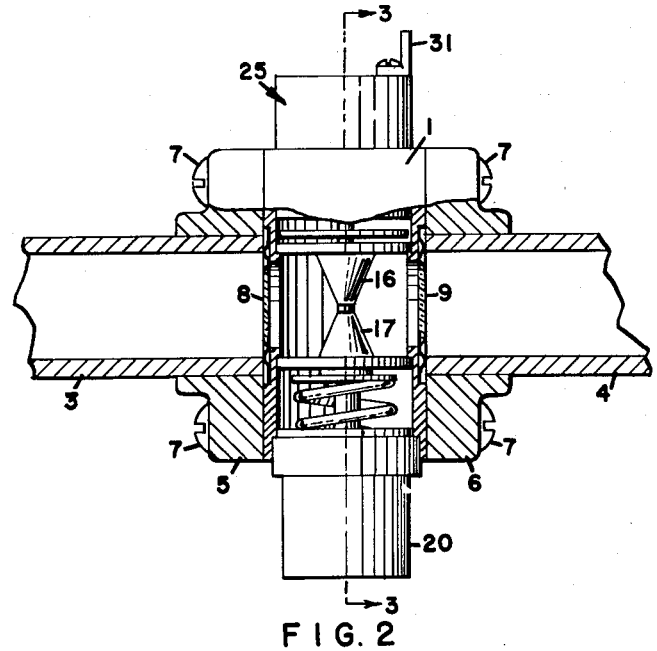
Figure 2 is a side elevation, partly in section, of the device, according to my invention, showing an illustrative method of mounting in wave guide structure.

Referring now to the drawings, Figure 1 illustrates a preferred embodiment of the invention having a body member 1 of a conductive metal with tapped holes as at 2 suitable for mounting the device in wave guide structure. In Figure 2 a suggested method of mounting is shown with two sections of conventional rectangular shaped wave guides 3 and 4 having connecting flanges 5 and 6 secured thereto, as by brazing or soldering. The device may be mounted transversely to the wave guide structure and be secured by mounting screws 7. A resonant window with a dielectric enclosure is hermetically sealed in body member 1 as at 8 and 9 to permit passage of electromagnetic wave energy through the device.

The specific features of the present invention will now be described by referring to Figure 3. Body member 1 has an axial passage 10 therethrough and is provided with two spaced members 11 and 12 secured by brazing or soldering to the walls of said axial passage as at 13 and 14 to form a resonant cavity 15. The dimensions of cavity 15 may be determined by the selected frequency of operation.

Member 11 has a substantially conical portion 16 extending into the resonant cavity. Member 12 in the form of a diaphragm has a cone 17 sealed thereto in register with conical member 16.

The spacing between conical member 16 and cone 17 may be adjusted by means of tuning screw 18 cooperating with diaphragm 12. Screw 18 may be adjusted axially by means of differential nut 19 which is in threaded engagement with plug 20. The position of cone 17 in relation to member 16 may be controlled by means of a screw driver placed in slot 21 and in nut 19. Since conical members 16 and 17 form a part of the composite resonant circuit, they will be referred to as electrodes.

Figure 4:
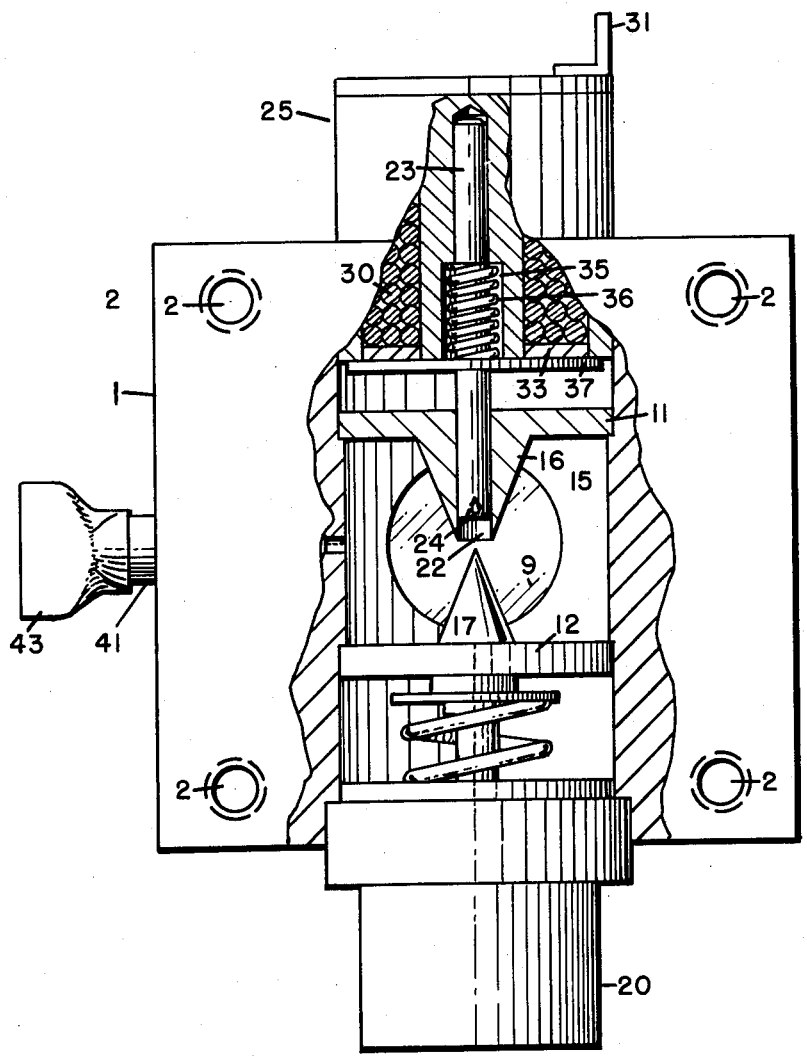
Figure 4 is an enlarged side elevation, partly in section, showing the device in its non-attenuating position.

According to the teachings of my invention electrode 16 is provided with a hollow passage 22, more clearly shown in Figure 4. Slidably disposed within passage 22 is an attenuating element 23 of a conductive metal, desirably brass or any other suitable metal, which in the illustrative embodiment, is in the form of a rod or plunger. Disposed at its inner tip is a conical shaped bore 24 coinciding with and adapted to engage the tip of tunable electrode 17. In full attenuating position, the end of rod 23 extends into the resonant cavity and engages the tip of electrode 17 with the conical-shaped bore 24 engaging and enclosing the tip of electrode 17.

It will be evident that in this position a short circuit will result across the resonant cavity and received signals will be attenuated to such a degree as to prevent burn-out or deterioration of the crystal detector. In a workable embodiment, a loss of 55 db was measured.

To retract attenuating rod 23 to a non-attenuating position, I next provide an electromagnet, shown generally at 25, hermetically sealed, as by brazing or soldering, to one end of the passageway 10 in envelope 1. The point of seal is shown at 26 and 27. Specifically, iron core 28 with an integral end plate 29 has spiral windings of wire 30 thereon with the external lead to the energizing means at 31, and is connected to shell 32. An annular ring 33 is friction fitted around core 28 to enclose the other end of the electromagnet. Axial bore 34 extends into the core with dimensions suitable to house the attenuating rod 33 when in its retracted position. A shoulder 35 is provided within the core 28. Spring 36 of a suitable material such as tungsten rests against the shoulder and urges rod 23 forward to maintain the attenuation position shortening electrodes 16 and 17. Armature 37 of a ferromagnetic material is fitted on the attenuating rod 23. When energized by a circuit, to be later described, armature 37 is attracted by the electromagnet and overcomes the tension of spring 36.

As seen in Figure 4 the attenuation is removed from the resonant cavity by retraction of the plunger. In this position armature 37 rests against annular ring 33. When de-energized the spring 36 again assumes its normal state and returns attenuating element 23 to its full attenuating position.

Figure 3:
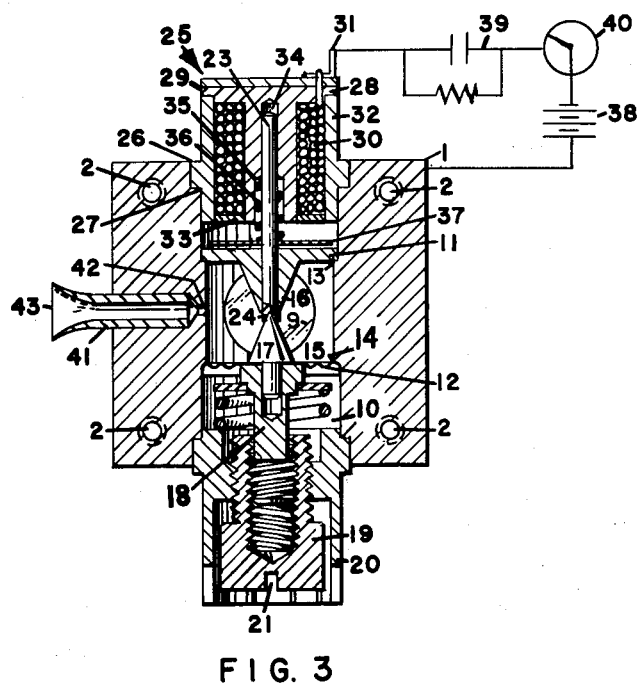
Figure 3 is an enlarged vertical cross-sectional view along the line 3—3 in Figure 2, together with a preferred circuit for energizing the device.

A suggested circuit for energizing electromagnet 25 may be provided within the guided missile housing and is diagrametically shown in Figure 3.

A low voltage source 38, desirably cellular type batteries, may be connected through a condenser resistor circuit 39 to limit the current flow after the initial surge necessary to retract the attenuator. A delay timing switch 40 is necessary to close the circuit at a predetermined time after the launching of the guided missile. In one embodiment, desired results have been attained with a 3 volt battery and a 10 watt resistor together with a 2,000 microfarad condenser when connected to an electromagnet having a resistance of 1 ohm and a closing pressure of 20 grams. Another suggested circuit (not shown) would include use of a thermistor having sufficient resistance increasing with time to decrease the energizing current to a steady value of between .25 and .35 ampere.

In many applications, it may be desirable to evacuate the attenuating device and introduce a suitable fill gas. For this purpose exhaust tubulation 41 may be inserted into envelope 1 with an aperture 42 communicating with the internal resonant cavity 15. After filling, exhaust tube 41 may be tipped off and sealed as at 43.

In certain applications, a suitable fill gas may be nitrogen or any other dry gas at normal atmospheric pressure. If a secondary switching device is desired, a radio frequency discharge may be initiated in the space between the conical electrodes by providing an ionizable gas such as argon, hydrogen or helium with a small percentage of water vapor under a reduced atmosphere of a few millimeters of mercury. When the attenuating plunger is retracted radio frequency above the desired level of power will initiate a breakdown of the ionizable gas and the resultant discharge will effectively block such strong signals from reaching the receiver. It will, therefore, be possible to incorporate the device in TR switches, commonly found in the art.

Figure 5:
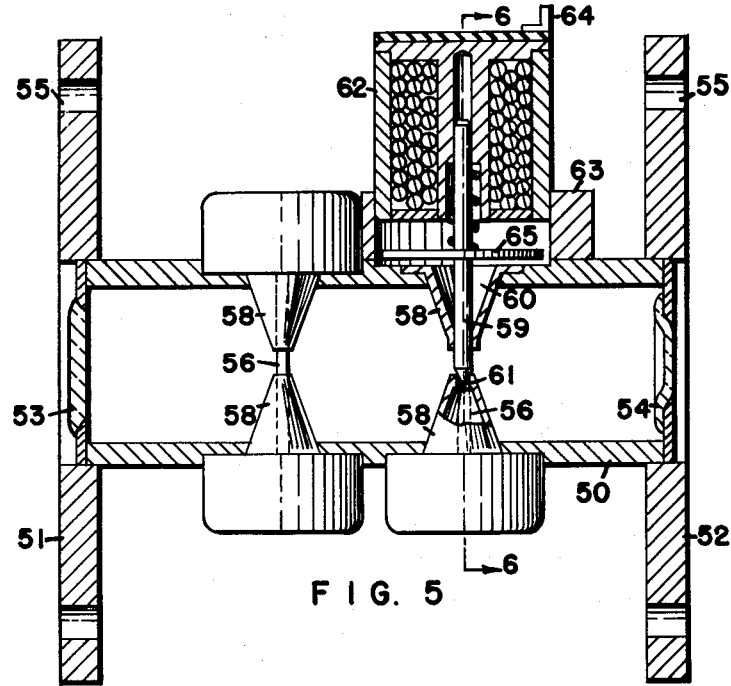
Figure 5 is a longitudinal cross sectional view of an alternative embodiment of my invention.
Figure 6:
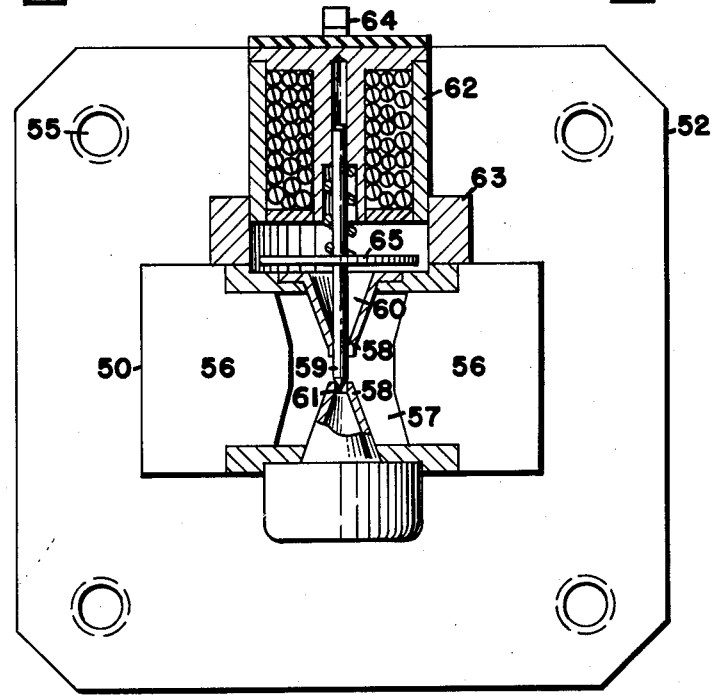
Figure 6 is a vertical cross sectional view along the line 6—6 in Figure 5.

An alternative embodiment of the invention, as shown in Figure 5, is a broad band device for transmitting radio frequency signals of a wider frequency range.

The envelope comprises a length of rectangular metallic wave guide 50 with metal end flanges 51 and 52 secured thereto. The end flanges 51 and 52 are provided with a central resonant aperture and a glass window enclosing the apertures 53 and 54 for transmission of radio frequency energy through the device. Four mounting holes 55 are provided in each end flange for mounting the device in radar systems. Extending transversely inside wave guide 50 are rectangular plates 56 forming resonant irises 57. Disposed within each resonant iris are hollow conical electrodes 58 spaced apart to form a discharge gap. The plates 56 together with cones 58 form a composite resonant circuit. In the illustrative embodiment two such resonant circuits are shown, and are generally spaced apart a quarter of a wave length. By increasing the number of resonant circuits, in the manner known in the art, a broader band of frequencies may be covered.

According to the teachings of the invention, I provide in one of electrodes 58 an attenuating rod 59, slidably disposed in passage 60. The attenuating rod extends through the aperture in the electrode and presents a short-circuit to radio frequency energy by communicating and extending a short distance through aperture 61 in the oppositely disposed electrode.

An electromagnet 62 is hermetically sealed to a metal ring 63 which in turn is sealed to wave guide section 50. When energized by an external circuit connected to lead 64, armature 65 moves upward against the electromagnet and thereby withdraws rod 59 to its non-attenuating position.

Since only radio frequency signals of the resonant frequency will be transmitted through the resonant irises a suitable band pass device is thus provided. The receiver branch of the system may be coupled to the end flange 52 in the manner well known in the art.

In the illustrative embodiment, I have shown the attenuating device in one resonant circuit, however, additional attenuation is possible by providing a similar device in each resonant circuit.

While several embodiments of the present invention have been described, other variations and modifications will occur to those skilled in the art. It is, therefore, my intent to cover such modifications and variations as fall within the spirit and scope of the invention as set forth in the appended claims.

What is claimed is:

1. A resonant cavity attenuator adapted for mounting in waveguide structure comprising an envelope of a conductive metal having a resonant cavity formed therein, plural electrode structure forming a discharge gap mounted within said resonant cavity, electrically conductive means for attenuation of high frequency radio signals operatively associated with said electrode structure to provide a continuous short circuit across said discharge gap and electromechanical means operable on said attenuating means to selectively move said electrical conductive means relative to said gap whereby the short circuit is removed.

2. A resonant cavity attenuator adapted for mounting in waveguide structure comprising a metallic envelope having an axial passage therethrough, spaced wall members within said passage defining a resonant cavity, a pair of oppositely disposed conical electrodes defining a discharge gap within said cavity, one of said electrodes being hollow, an attenuating member of a conductive metal slidably disposed within said hollow electrode, said attenuating extending across said discharge gap to contact the opposing electrode when in full attenuating position and electromechanical means for moving said attenuating member to a non-attenuating position within said hollow electrode.

3. A resonant cavity attenuator as claimed in claim 2 wherein said removing means include an armature mounted transversely on said attenuating member and electromechanical means mounted at one end of said axial passage.

4. A resonant cavity attenuator adapted for mounting in waveguide structure comprising a hermetically sealed enclosure with transmitting window elements centrally positioned on opposed sides thereof, said enclosure having an axial passage therethrough, spaced wall members within said passage defining a resonant cavity, plural opposed conical discharge gap electrode structure within said cavity, one of said gap electrodes being hollow, a rod of conductive metal slidably disposed within said hollow electrode, a flat annular disc of a magnetic material mounted transversely at an intermediate point on said rod, said disc contacting the large end of said hollow conical electrode when said rod is in full attenuating position contacting the opposing conical electrode and electromechanical means enclosing an end of said axial passage operatively associated with the non-contacting end of said rod for moving said rod out of contact with said opposed conical electrode.

References Cited in the file of this patent

UNITED STATES PATENTS

| | | |
|---|---|---|
| 2,496,865 | Fiske | Feb. 7, 1950 |
| 2,668,276 | Schooley | Feb. 2, 1954 |

OTHER REFERENCES

Bollinger, abstract of application Serial Number 694,044, published November 21, 1950, class 178–44, now class 333–98.